United States Patent
Guschina et al.

(10) Patent No.: US 7,962,919 B2
(45) Date of Patent: Jun. 14, 2011

(54) APPARATUS AND METHOD FOR MODIFYING AN INITIAL EVENT QUEUE FOR EXTENDING AN XML PROCESSOR'S FEATURE SET

(75) Inventors: Elena Guschina, Nizhegorodsky (RU); Vladimir Tatarinov, Nizhegorodsky (RU)

(73) Assignee: Intel Corporation, Santa Clara, CA (US)

( * ) Notice: Subject to any disclaimer, the term of this patent is extended or adjusted under 35 U.S.C. 154(b) by 1224 days.

(21) Appl. No.: 11/393,075

(22) Filed: Mar. 29, 2006

(65) Prior Publication Data

US 2007/0240168 A1    Oct. 11, 2007

(51) Int. Cl.
*G06F 15/00* (2006.01)
*G06F 9/45* (2006.01)
*G06F 17/00* (2006.01)

(52) U.S. Cl. ......... 719/314; 717/143; 715/234; 715/237
(58) Field of Classification Search .................. 719/328, 719/314, 318; 715/234, 237; 717/143
See application file for complete search history.

(56) References Cited

U.S. PATENT DOCUMENTS

| | | | |
|---|---|---|---|
| 6,286,052 B1 * | 9/2001 | McCloghrie et al. | 709/238 |
| 6,880,125 B2 * | 4/2005 | Fry | 715/234 |
| 7,562,352 B2 * | 7/2009 | Yamada et al. | 717/136 |
| 2005/0039124 A1 * | 2/2005 | Chu et al. | 715/531 |
| 2005/0097455 A1 * | 5/2005 | Zhou et al. | 715/513 |
| 2007/0050704 A1 * | 3/2007 | Liu | 715/513 |
| 2007/0113222 A1 * | 5/2007 | Dignum et al. | 717/143 |

* cited by examiner

*Primary Examiner* — Lechi Truong
(74) *Attorney, Agent, or Firm* — Blakely, Sokoloff, Taylor & Zafman LLP

(57) ABSTRACT

A method and apparatus for modifying an events queue for extending an extended mark-up language (XML) processor's feature set are described. In one embodiment, the method includes the parsing of an XML document to generate an initial event queue. During parsing of the XML document, an event associated with a parser plug-in module may be detected. When an event associated with a parser plug-in module is detected, control is passed to the plug-in module to perform event-based functionality to modify the initial event queue to form a modified event queue. Subsequently, any additional event information contained within the modified event queue, as generated by the parser plug-in module, is reported to, for example, an end user application. Other embodiments are described and claimed.

8 Claims, 7 Drawing Sheets

```
<?xml version='1.0'?>
<document xmlns:xi="http://www.w3.org/2001/XInclude">
    <p>This document has been accessed <xi:include href="count.txt" parse="text"/> times.</p>
</document>
```
— 606

324387 — 607

```
<?xml version='1.0'?>
<document xmlns:xi="http://www.w3.org/2001/XInclude">
    <p>This document has been accessed 324387 times.</p>
</document>
```
— 608

APPARATUS AND METHOD FOR MODIFYING AN INITIAL EVENT QUEUE FOR EXTENDING AN XML PROCESSOR'S FEATURE SET

FIELD

One or more embodiments relate generally to the field of mark-up languages. More particularly, one or more of the embodiments relate to a method and apparatus for modifying an events queue for extending an XML processor's feature set.

BACKGROUND

Hypertext mark-up language (HTML) is a presentation mark-up language for displaying interactive data in a web browser. However, HTML is a rigidly-defined language and cannot support all enterprise data types. As a result of such shortcomings, HTML provided the impetus to create the extensible mark-up language (XML). The XML standard allows an enterprise to define its mark-up languages with emphasis on specific tasks, such as electronic commerce, supply chain integration, data management and publishing.

XML, a subset of the standard generalized mark-up language (SGML), is the universal format for data on the worldwide web. Using XML, users can create customized tags, enabling the definition, transmission, validation and interpretation of data between applications and between individuals or groups of individuals. XML is a complementary format to HTML and is similar to HTML as both contain mark-up symbols to describe the contents of a page or file. A difference, however, is that HTML is primarily designed to specify the interaction and display text and graphic images of a web page. XML does not have a specific application and can be designed for a wide variety of applications.

For these reasons, XML is rapidly becoming the strategic instrument for defining corporate data across a number of application domains. The properties of XML mark-up make it suitable for representing data, concepts and context in an open, vender and language neutral manner. XML uses tags, such as, for example, identifiers that signal the start and end of a related block of data, to recreate a hierarchy of related data components called elements. In turn, this hierarchy of elements provides context (implied meaning based on location) and encapsulation. As a result, there is a greater opportunity to reuse this data outside the application and data sources from which it was derived.

SAX (simple application programming interface (API)) for XML, is a traditional, event-driven parser. SAX reads the XML document incrementally, calling certain call-back functions in the application code whenever it recognizes a token. Call-back events are generated for the beginning and end of a document, the beginning and end of an element, etc. The SAX parser may populate an event queue with detected SAX events to enable certain call-back functions in the user application code whenever a recognized token is detected.

BRIEF DESCRIPTION OF THE DRAWINGS

The various embodiments of the present invention are illustrated by way of example, and not by way of limitation, in the figures of the accompanying drawings and in which:

FIG. 6 is a block diagram illustrating XML include functionality within an XML parser, in accordance with one embodiment.

DETAILED DESCRIPTION

A method and apparatus for modifying an initial event queue for extending an extended mark-up language (XML) processor's feature set are described. In one embodiment, the method includes the parsing of an XML document to generate an initial event queue. During parsing of the XML document, an event associated with a parser plug-in module may be detected. When an event associated with a parser plug-in module is detected, control is passed to the plug-in module to perform event-based functionality to modify the initial event queue to form a modified event queue. Subsequently, any additional event information contained within the modified event queue, as generated by the parser plug-in module, is reported to, for example, an end user application.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

System

Figure 1:
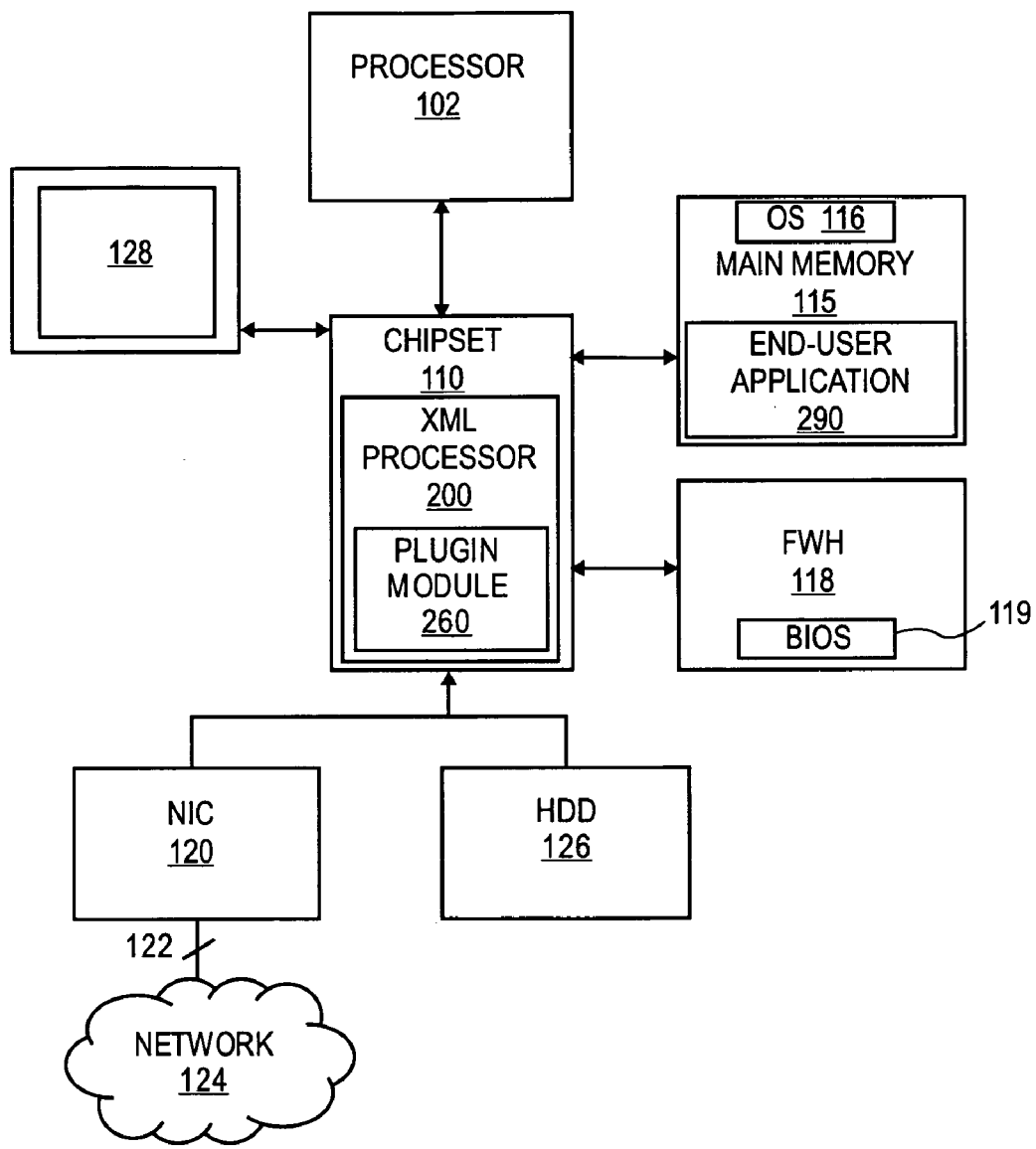
FIG. 1 is a block diagram illustrating a computer system including an XML processor having a plug-in module to enable modification of an events queue for extending a feature set of the XML processor, according to one embodiment.

FIG. 1 is a block diagram illustrating computer system 100 including an extended mark-up language (XML) processor 200 having at least one plug-in module 260 for modifying an initial event queue for extending an XML processor's feature set, according to one embodiment. Representatively, system 100 comprises interconnect 104 for communicating information between processor (CPU) 102 and chipset 110. In one embodiment, CPU 102 may be a multi-core processor to provide a symmetric multiprocessor system (SMP). As described herein, the term "chipset" is used in a manner to collectively describe the various devices coupled to CPU 102 to perform desired system functionality.

Representatively, display 128, network interface controller (NIC) 120, hard drive devices (HDD) 126, main memory 115 and firmware hub (FWH) 118 may be coupled to chipset 110. In one embodiment, chipset 110 is configured to include a memory controller hub (MCH) and/or an input/output (I/O) controller hub (ICH) to communicate with I/O devices, such as NIC 120. In an alternate embodiment, chipset 110 is or may be configured to incorporate a graphics controller and operate as a graphics memory controller hub (GMCH). In one embodiment, chipset 110 may be incorporated into CPU 102 to provide a system on chip.

In one embodiment, main memory 115 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Representatively, computer system 100 further includes non-volatile (e.g., Flash) memory 118. In one embodiment, flash memory 118 may be referred to as a "firmware hub" or FWH, which may include a basic input/output system (BIOS) 119 that is modified to perform, in addition to initialization of computer system 100, initialization of XML processor 200 and plug-in module 260 for modifying an initial event queue for extending an XML processor's feature set, according to one embodiment.

As further illustrated in FIG. 1, network interface controller (NIC) 120 may couple network 124 to chipset 110. In the embodiments described, network 124 may include, but is not limited to, a local area network (LAN), a metropolitan area network (MAN), a wide area network (WAN), a wireless network including a wireless LAN (WLAN), a wireless MAN (WMAN), a wireless WAN (WWAN) or other like network. Accordingly, in the embodiments described, NIC 120 may provide access to either a wired or wireless network. It should be recognized in the embodiments described, NIC 120 may be incorporated within chipset 110.

In one embodiment, NIC 120 may receive an input XML document 122 from network 124. As further shown in FIG. 1, end user application 290, which may be loaded within main memory 115 by operating system (OS) 116, for execution by processor 102, may rely on data, such as elements represented by input XML document 122. Accordingly, in one embodiment, XML processor 200 parses input XML document 122 to provide the data contained therein to end user application 290. As described in further detail below, plug-in module 260 enables XML processor 200 to include an expanded feature set by, for example, modifying an initial event queue to provide extended functionality to end user application 290, according to one embodiment.

Figure 2:
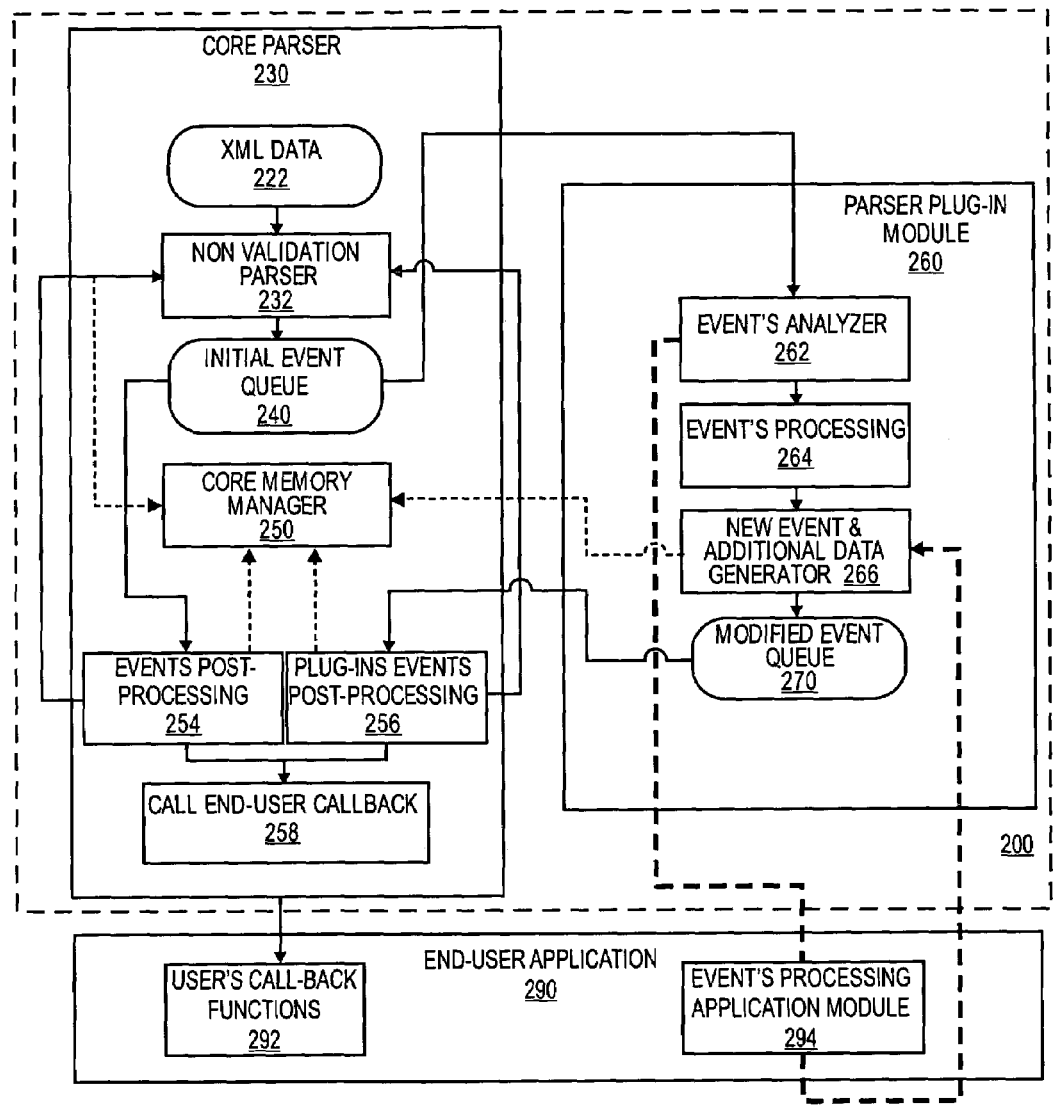
FIG. 2 is a block diagram further illustrating the XML processor and plug-in module of FIG. 1, in accordance with one embodiment.

FIG. 2 is a block diagram further illustrating XML processor 200 of FIG. 1, in accordance with one embodiment. Representatively, XML processor 200 may include core parser 230. In one embodiment, core parser 230 is, for example, a simple application programming interface (API) for XML (SAX) parser. To simply the design of XML processor 200, core SAX parser 230 may include, for example, a non-validating parser 232. As described herein, a non-validating SAX parser refers to a parser that parses an XML document but does not subject the XML document to a validation procedure to determine whether the XML document is valid. As described herein, validation procedures may include document-type definitions (DTD), XML schema validation, or other like validation procedure.

As shown in FIG. 2, in one embodiment, non-validating parser 232 generates initial event queue 240 from input XML data 222. In one embodiment, initial event queue 240 provides a representation of an XML document as a sequence of SAX events. Using initial event queue 240, various plug-ins may be generated based on non-validating SAX parser 232. In one embodiment, initial event queue 240 is presented as an array of structures with the following fields:

eventID—event identification information;
location—location information of this event; and
data—data for this event.

In one embodiment, initial event queue 240 is provided as an input to at least one parser plug-in module 260. In one embodiment, parser plug-in module 260 includes event analyzer 262 to analyze initial event queue 240 and event processing functionality 264 to perform event-based functionality. As described herein, event-based functionality may include validation of an XML document, parsing of an inclusion document, data reduction logic, or other like functionality for extending the features of XML processor 200. As further shown in FIG. 2, parser plug-in module 260 may include data generator 266 for providing new events and additional data within an initial event queue 240 to form a modified event queue 270 to include the new events and additional data.

As described herein, parser plug-in modules may include, but are not limited to DTD plug-ins, XML schema validation plug-ins, DOM tree building plug-ins, XSL (Extensible Stylesheet Language) transformations (XSLT), XInclude plug-ins or other like plug-ins for extending an XML processor's functionality. As shown in FIG. 2, standard inputs for parser plug-in 260 may include initial event queue 240, a memory manager 250 for allocating memory used by a parser plug-in module, as well as a link to initial event queue. Accordingly, in one embodiment, initial event queue 240 is generated by parser 232, such that events generated during parsing of input XML document 222 are packed into initial event queue 240.

In one embodiment, memory manager 250 is represented by a class that allows control over memory operations inside parser plug-in 260. In one embodiment, when a plug-in needs to modify received information, the plug-in may use memory manager 250 to avoid conflicts between use of different memory modules by parser core 240 and parser plugs-ins 260. In one embodiment, memory manager 250 performs memory distribution among different modules. Memory manager 250 may deal with two kinds of memory: SAX parser system memory and SAX event data memory.

In one embodiment, memory manager 250 stores information about SAX parser states and is responsible for handling of extensible events queue structure. In one embodiment, memory manager 250 deals with internal memory. In one embodiment, memory manager 250 allocates system memory through invoking of user-defined callback functions for allocation/reallocation/free memory in case of SW implementation. In one embodiment, memory manager 250 stores data of SAX events that go to end user application 290 and invokes user defined callback functions for allocation/reallocation/free memory.

Accordingly, in one embodiment, plug-in module 260 does not work directly with SAX parser system memory. The process of updating SAX parser system memory is hidden by public API functions (such as, InsertEventBefore, InsertEventAfter, see, Table 4), but a plug-in has to call memory manager 250 to store data of a SAX event in SAX event data memory, otherwise the data of a newly generated or updated event will not be processed by post-processing module 294 and as result, cannot be accessed from end user application 290.

Standard output from parser plug-in 260 may include modified event queue 270, where modified events queue 270 may include additional data, such as a DOM tree for a DOM plug-in, post validation information (PVI) for an XML schema validation plug-in or other like additional data. In one embodiment, event analyzer 262 provides event information to an event processing application module 294 of end user application 290. As further illustrated in FIG. 2, SAX events post-processing logic 254 and plug-in event post-processing 256 may generate callbacks 258 for user callback functions 292.

A list of supported SAX events, according to one embodiment, may include, but is not limited to:
StartDocument,
EndDocument,
StartElement,
EndElement,
CDATASection,
CharData,
Comment,
ProcessingInstruction,
StartPrefixMapping,
EndPrefixMapping,
StartDTDDeclaration,
EndDTDDeclaration,
ElementDeclaration,
AttributeDeclaration,
NotationDeclaration Accordingly, based on such events, a parser plug-in module may be associated with a respective event to begin performing of the additional event-based functionality. As shown in FIG. 2, core SAX parser 230 includes non-validating SAX parser 232 and a set of plug-ins 260 that extend core parser's 230 functionality. In one embodiment, new features may be added to core SAX parser 230, such as DOM functionality, XSLT and XInclude without rewriting of core parser 230. Also, because all plug-ins use the same data flow, some memory optimization may be performed using the memory manager. Accordingly, using modified events queue 270 allows not only processing of SAX events and generation of additional data, but also changes the stream of data provided to additional parser plug-ins and an end user application.

Figure 3:
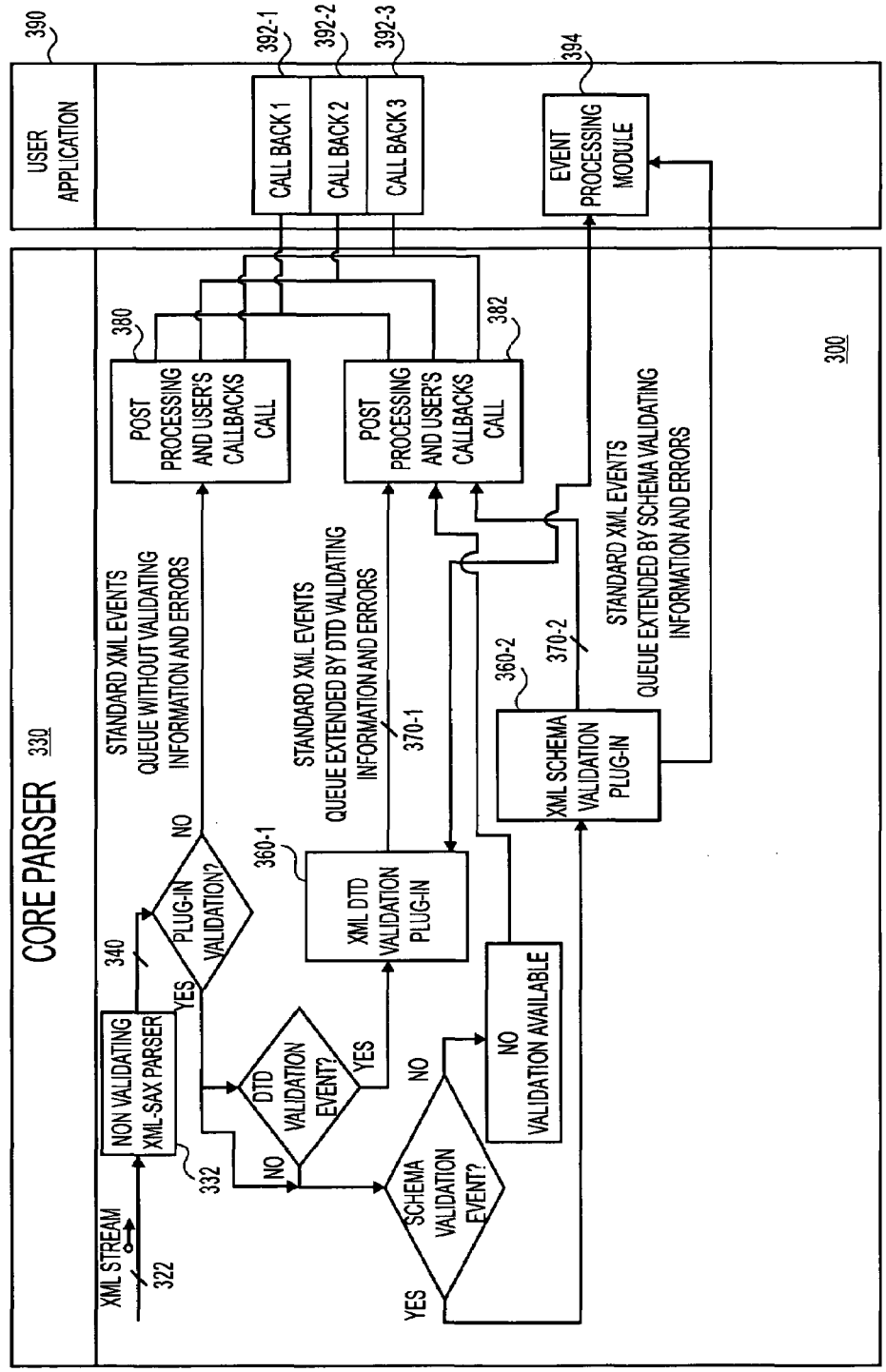
FIG. 3 is a block diagram further illustrating an XML processor including multiple plug-in modules to provide validation functionality to a non-validating XML parser, in accordance with one embodiment.

Accordingly, in one embodiment, a validating parser may be formed from a non-validating XML parser 332, for example, as shown in FIG. 3. By definition, validation is the process of examination of documents against specified constraint rules. Current constraint rules for XML can be specified in two ways: document-type definitions (DTD), XSD (XML Schema Definition language) or other like constraint rules. In the classical situation, validation support mode and XML processing is required to implement validating XML parsers. In one embodiment, a validating plug-in can report validation information by insertion of new events into an event queue, such that processing following of the SAX parser can work with the validation information inserted by the parser plug-in module. As a result, validation information may be reported by the plug-in to avoid the need for making serious changes to the XML SAX parser to provide validation.

FIG. 3 illustrates an XML processor 300 including a core SAX parser 330 having a non-validating XML parser 242. As illustrated, if plug-in validation is available and DTD validation is one, it causes invocation of an XML DTD validation plug-in 360-1. In addition, if a schema validation is required, a scheme validation plug-in 360-2 may be invoked. In accordance with such an embodiment, XML DTD validation plug-in 360-1 provides a modified events queue 370-1, which includes standard XML events extended by DTD validation information and validation errors (violation of DTD validation constraints).

In one embodiment, XML schema validation plug-in provides modified event queue 370 including standard XML events queue, which are extended by schema validating information and validation errors (violation of XML schema validation constraints). Accordingly, features provided by a core XML processor 300 may be extended by providing a pipeline of plug-ins to achieve a desired XML processing functionality to enable various end user applications 390. Procedural methods for implementing one or more embodiments are now described.

Operation

Figure 4:
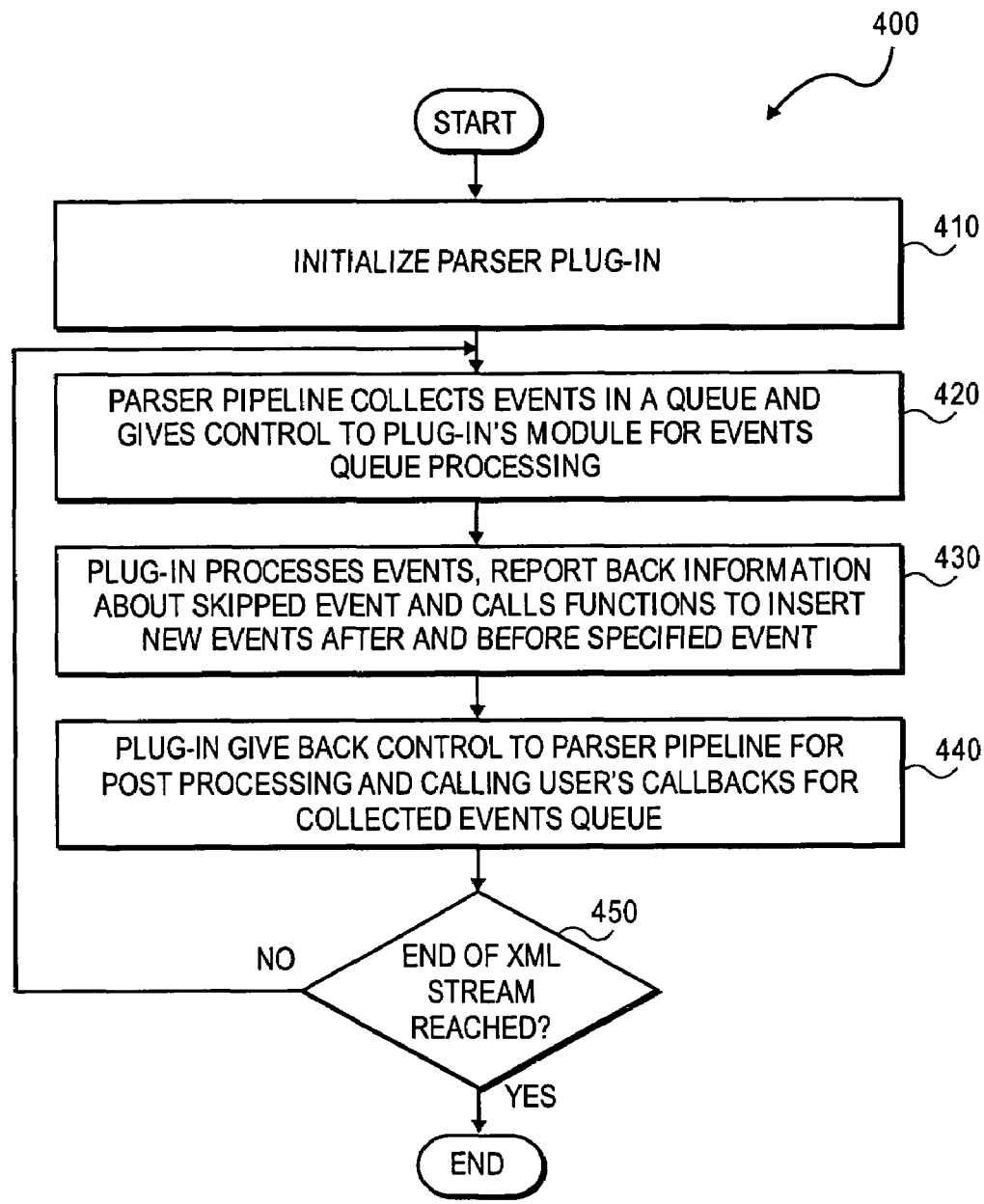
FIG. 4 is a flowchart illustrating a method for modifying an events queue to extend an XML processor's feature set, according to one embodiment.

Turning now to FIG. 4, the particular methods associated with various embodiments are described in terms of computer software and hardware with reference to a flowchart. The methods to be performed by a computing device (e.g., an XML processor) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 4 is a flowchart illustrating a method 400 for modifying an initial event queue for extending an XML processor's feature set, in accordance with one embodiment. In the embodiments described, examples of the described embodiments will be made with reference to FIGS. 1-3. However, the described embodiments should not be limited to the examples provided to limit the scope provided by the appended claims.

Referring again to FIG. 4, at process block 410, modification of an events queue using at least one parser plug-in module begins with initialization of at least one parser plug-in module. In one embodiment, such initialization may be include memory allocation and initialization of structures for the parser plug-in module. In addition, callbacks of event handlers may be initialized. Callbacks of parser plug-in modules enable association of an XML event with a parser plug-in module.

Table 1 illustrates pseudo-code for initialization and delete stages for parser plug in modules.

TABLE 1

INITIALIZATION AND DELETE STAGES

Plug *cbPlugin;
SAX * saxCtx = NULL;
    // initiate Plugin structure
        InitPlugin Structure (&cbPlugin);
    // initialize SAX parser TABLE 1-continued

INITIALIZATION AND DELETE STAGES

```
SAXInit (&saxCtx, &cbMem, & cbThread);
// set plugin structure into SAX parser
       SAXSetPlugin(saxCtx,&cbPlugin);
// application code
...
// reset plugin structure from SAX parser
       SAXSetPlugin (saxCtx, 0);
// delete SAX parser
       SAXDelete (saxCtx);
// delete Plugin structure
       DeletePluginStructure(&cbPlugin);
```

Referring again to FIG. 4, at process block 420, a parser pipeline collects events in a queue, referred to herein as an "initial event queue." During the collection of events in initial event queue, an event may be detected having an associated parser plug-in module. In response to such detection, a non-validating parser may pass control the parser plug-in module so that the parser plug-in module may perform SAX events queue processing.

Table 2 illustrates pseudo-code regarding a parser plug-in structure.

TABLE 2

PLUGIN STRUCTURE

```
typedef struct {
    Plug_cbCtx*         pCtx; // internal plugin context
    Char*               pEncoding; // required encoding
    Cb-InitPlug-in      initPlugin; // pointer to initialization
                        function
    Cb_SetupEvent       setupEvent; // pointer to get handlers
                        for events
// stuff that allow plug-in to deal with external XML
things by PublicID and System ID
    Cb_LoadGrammar      loadGrammar;
    Cb_UnloadGrammar    unloadGrammar;
    Cb_UnloadAllGrammars unloadAllGrammars;
// stuff that allow core SAX parser to work with Plugin info set
    Cb_ReleaseInfoHandle releaseInfoHandle;
    Cb_GetError         getError;
    Cb_GetErrorsCount   getErrorsCount;
} Plugin;
```

Table 3 illustrates pseudo-code for enabling or providing functions to enable a plug-in to process events. Representatively, a process event callback function is provided, which includes parameters, such as a plug-in defined SAX callback context, a pointer to the event structure and a handle to the plug-in's info set for the event.

TABLE 3

FUNCTION TO PROCESS EVENTS THROUGH PLUGIN

```
* Cb_Process Event — callback function pointer.
* Purpose
*    This is pointer of plugin defined function
*    to handle event from XML Core Parser.
* Parameters
* (in)pCtx — plugin defined SAX callbacks context.
           This pointer will be passed to each plugin callback
           function as a first parameter.
* (in)pEvent — pointer on event structure
* (out) pInfoHandle — a handle of plugin's info set for this event
*
* Return
*    StsNoErr if event processed successfully
*    function returns StsEventIgnore if current event should be
    removed from queue
```

Referring again to FIG. 4, at process block 430, the plug-in processes SAX events and reports back information about skipped events. In one embodiment, the parser plug-in module may as well as call functions to insert new events either before or after a skipped event, as shown in Table 4.

TABLE 4

FUNCTION TO INSERT NEW EVENTS AND MODIFY EVENT QUEUE

```
* InsertEventBefore / InsertEventAfer — function.
* Purpose;
*    allow plugin to insert new event before / after selected event
* Parameters:
*    (in)pCtx — Pointer to the parser context.
*    (in)newEventID — new event ID
*    (in)pEvent — event after new event will be inserted
* Return
*    StsNoErr if operation was successful.
*    StsNullPtrErr if pCtx is null.
*    StsInternalError if event can't be inserted to event queue.
```

Table 4 illustrates pseudo-code for inserting new events for generation of a modified events queue. In one embodiment, insertion or deletion of events within the event queue, as performed at process block 430, may be provided using the pseudo-code of Table 4, which illustrates functions for inserting new events and modifying the events queue, which allows insertion of event before or after a selected event. Pointers for the insert event function include a pointer to the parser context (pCtx), a new event ID (newEventID) and a pEvent, which indicates an event after the new event, which will be inserted.

Referring again to FIG. 4, control is returned from the plug-in to the parser pipeline for post-processing and calls to user callback function according to the modified event queue. At process block 450, it is determined whether an end of XML stream is reached. Until the end of the XML stream is reached, process blocks 420-440 are repeated.

Figure 5:
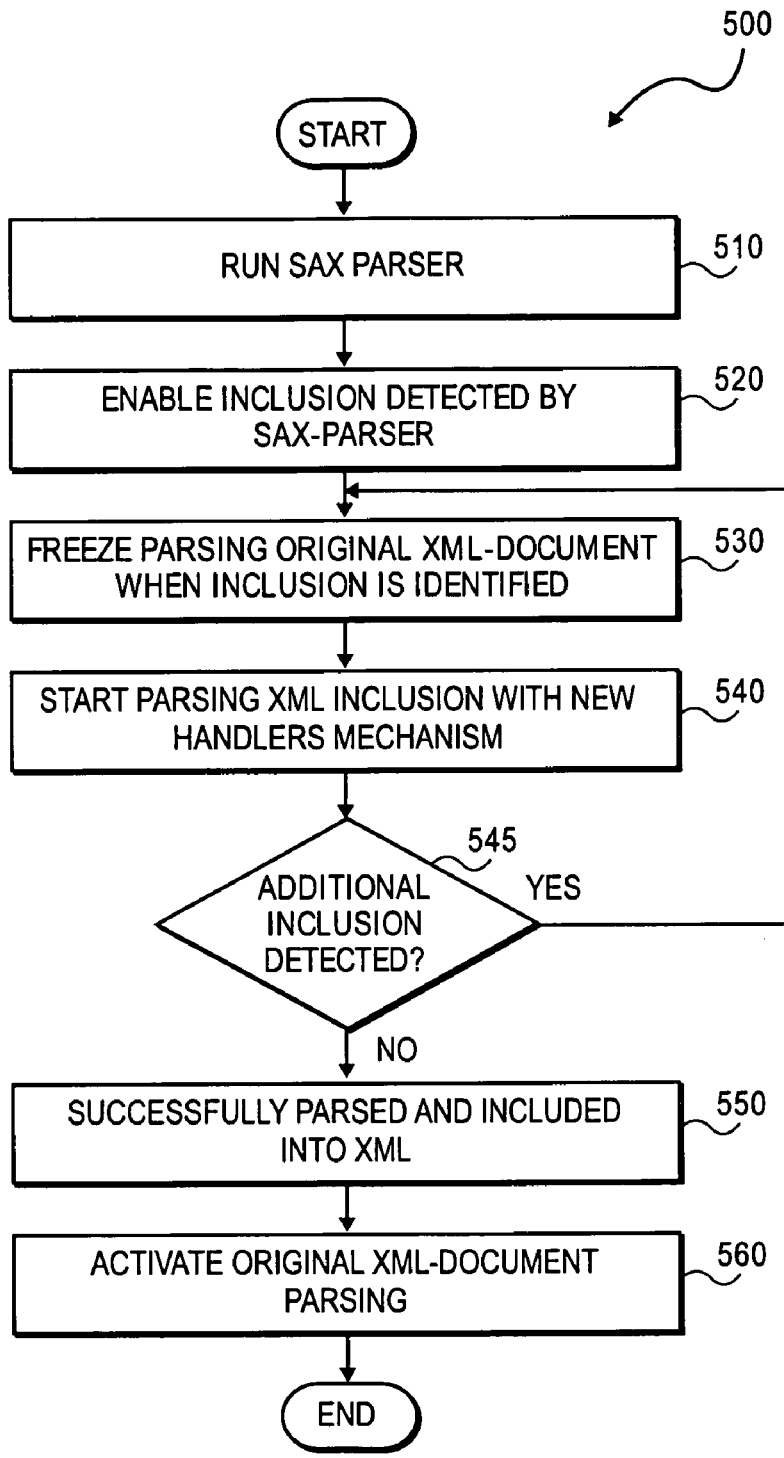
FIG. 5 is a flowchart illustrating a method for modifying an events queue to extend an XML processor's feature set, in accordance with one embodiment.

FIG. 5 is a flowchart illustrating a method 500 for providing XInclude functionality to a non-validating XML processor according to one embodiment. As shown in FIG. 6, a working example 600 of XML documents 606 and 608, including XInclude functionality to provide reference number. Referring again to FIG. 5, at process block 510, a SAX parser is run. While running, at process block 520, inclusion detection is enabled by a parser inclusion plug-in module. At process block 530, inclusion detection freezes parsing of the original XML document. Subsequently, at process block 540, parsing of the XML inclusion documents may be performed by a parser plug-in module. At process block 545, an additional inclusion may be detected, causing a repeat of processor blocks 530 and 540 to parse the additional (nested) inclusion. At process block 550, it may be determined whether the included XML document has been successfully parsed.

Accordingly, at process block 550, process block 540 is repeated until the included XML document has been successfully parsed. Once successfully parsed, activation of the original XML document parsing is performed. Accordingly, in one embodiment, as shown in FIG. 5, inclusion can be detected and processed in a plug-in branch. New events from inclusion can be easily inserted into the queue of the main XML document. As a result, XML processing followed by an XML SAX parser automatically supports XInclude functionality, according to one embodiment.

In some situations (usually when an XML file has a very large size), it is important to build document object model (DOM) representations that excludes some portion of the XML data, referred to herein as "lazy DOM." For example, a lazy DOM document may refer to a DOM document that has a limitation of the nesting level of the result tree or to build a sub-tree of XML data according to a specified path. Conventionally, generation of lazy DOM documents requires a special SAX handler mechanism to skip unneeded information from the SAX processor. In one embodiment, a lazy DOM plug-in module can be implemented that filters information not required for building a lazy DOM document according to the specific limitation required by an end user application handler.

In some situations, it is necessary to make transformations of XML documents during the parsing stage, for example, to extract information from XML and report such information to an end device by a specified format, such as Resource Description Framework (RDF). Conventionally, such functionality requires a special XSL document and execution to an XSLT mechanism to build another XML representation. In one embodiment, an XSLT parser plug-in module can insert new events and skip some unneeded events in the initial events queue during SAX parsing and report functions can update the initial XML document.

Accordingly, in one embodiment, a SAX events queue mechanism enables extensible functionality at an initial stage of XML processing. In one embodiment, the mechanism can be implemented as a set of plug-ins to a main parsing pipeline with special functionality to insert new events and skip unneeded events from the initial events queue. In one embodiment, the initial events queue is generated by a non-validating SAX parser and is modified according to a parser plug-in module to generate a modified events queue.

Figure 7:
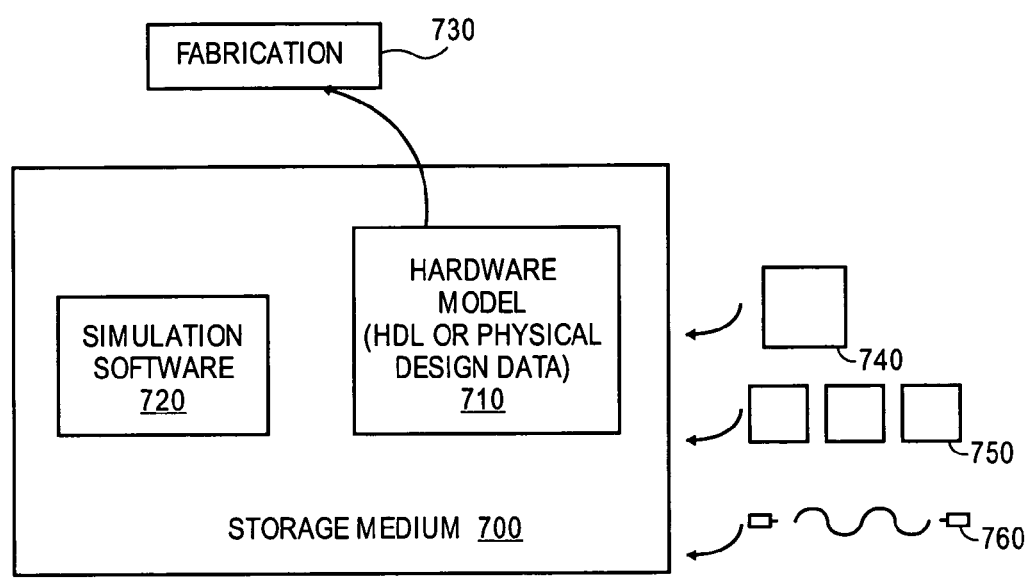
FIG. 7 is a block diagram illustrating various design representations or formats for simulation, emulation and fabrication of a design using the disclosed techniques.

FIG. 7 is a block diagram illustrating various representations or formats for simulation, emulation and fabrication 730 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite to the hardware model to determine if it indeed functions as intended. In some embodiments, the simulation software is not recorded, captured or contained in the medium.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 102, for other embodiments, a multiprocessor or multicore processor system (where one or more processors may be similar in configuration and operation to the CPU 102 described above) may benefit from parser plug-in modules for extending an XML processor's feature set of various embodiments. Further different type of system or different type of computer system such as, for example, a server, a workstation, a desktop computer system, a gaming system, an embedded computer system, a blade server, etc., may be used for other embodiments.

Elements of embodiments may also be provided as a computer-readable medium for storing the machine-executable instructions. The computer-readable medium may be a computer-readable storage medium including, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards. A computer-readable transmission medium may include propagation media or other type of computer-readable transmission media suitable for transferring electronic instructions. For example, embodiments described may be downloaded as a computer program which may be transferred from a remote computer (e.g., a server) to a requesting computer (e.g., a client) by way of data signals embodied in a carrier wave or other computer-readable propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
    detecting, during parsing of an XML document, with a non-validating parser plug-in module;
    passing control to a parser plug-in module to perform event-based functionality to modify an initial event queue by inserting at least one new event to form a modified event queue, wherein modifying the initial event queue comprises:
        running a simple application programming interface for XML (SAX) parser, freezing parsing of the XML document,
parsing the at least one new event,
repeating the freezing the parsing of the XML document and
parsing the at least one new event for each new event included; and
detecting a document object model (DOM) build event;
invoking the parser plug-in module to filter unneeded events from the initial event queue;
reporting to a user event handler information required for building lazy DOM document by placing a limitation on nesting levels utilizing a special SAX handler mechanisms that skips information from a SAX processor as determined by the limitations on the DOM; and
performing post processing functionality according to the modified event queue.

2. The method of claim 1, wherein the detecting further comprises:
detecting a validation event;
identifying a parser plug-in module associated with the detected validation event; and
passing control to the identified parser plug-in module including a link to the initial event queue.

3. The method of claim 1, wherein performing post-processing further comprises:
detecting new events inserted into the initial event queue by the non-validating parser plug-in module; and
reporting new event information and validation information to a user application.

4. The method of claim 1, further comprising:
detecting an inclusion event;
pausing parsing of the XML document;
invoking the parser plug-in module that parses an XML inclusion document; and
resuming parsing of the XML document, where the initial event queue of the XML document is updated according to the XML inclusion document.

5. The method of claim 1, wherein prior to detecting, the method further comprises:
parsing the XML document; and
populating of the initial event queue with detected events, excluding validation events and validation information.

6. An article of manufacture having a computer readable storage medium including associated data, wherein the data, when accessed, result in the computer performing operations comprising:
parsing an XML document to generate an initial events queue;
detecting, during the XML parsing, an event associated with a non-validating parser plug-in module;
passing control to a parser plug-in module to perform event-based functionality to modify the initial event queue by inserting at least one new event to form a modified event queue, wherein modifying the initial event queue comprises:
running a simple application programming interface for XML (SAX) parser,
freezing parsing of the XML document,
parsing the at least one new event,
repeating the freezing the parsing of the XML document and parsing the at least one new event for each new event included; and
detecting a document object model (DOM) build event;
invoking the parser plug-in module to filter unneeded events from the initial event queue;
reporting to a user event handler information required for building lazy DOM document by placing a limitation on nesting levels utilizing a special SAX handler mechanisms that skips information from a SAX processor as determine by the limitations on the DOM; and
reporting any additional event information contained within the modified event queue generated by the parser plug-in module.

7. The article of manufacture of claim 6, wherein invoking the event processing function further comprises:
loading a validation processing function;
validating the XML document according to a validation procedure; and
modifying the initial event queue to store validation information and error information to form the modified event queue.

8. The article of manufacture of claim 6, wherein invoking the event processing function further comprises:
pausing parsing of the XML document if an inclusion event is detected;
parsing an XML inclusion document to generate inclusion information;
inserting of new events into the event queue of the XML document to include the inclusion information; and
activating parsing of the XML document.

* * * * *